R. E. FOX.
FLEXIBLE GRAPH.
APPLICATION FILED MAR. 28, 1918.
1,420,249.
Patented June 20, 1922.
3 SHEETS—SHEET 1.
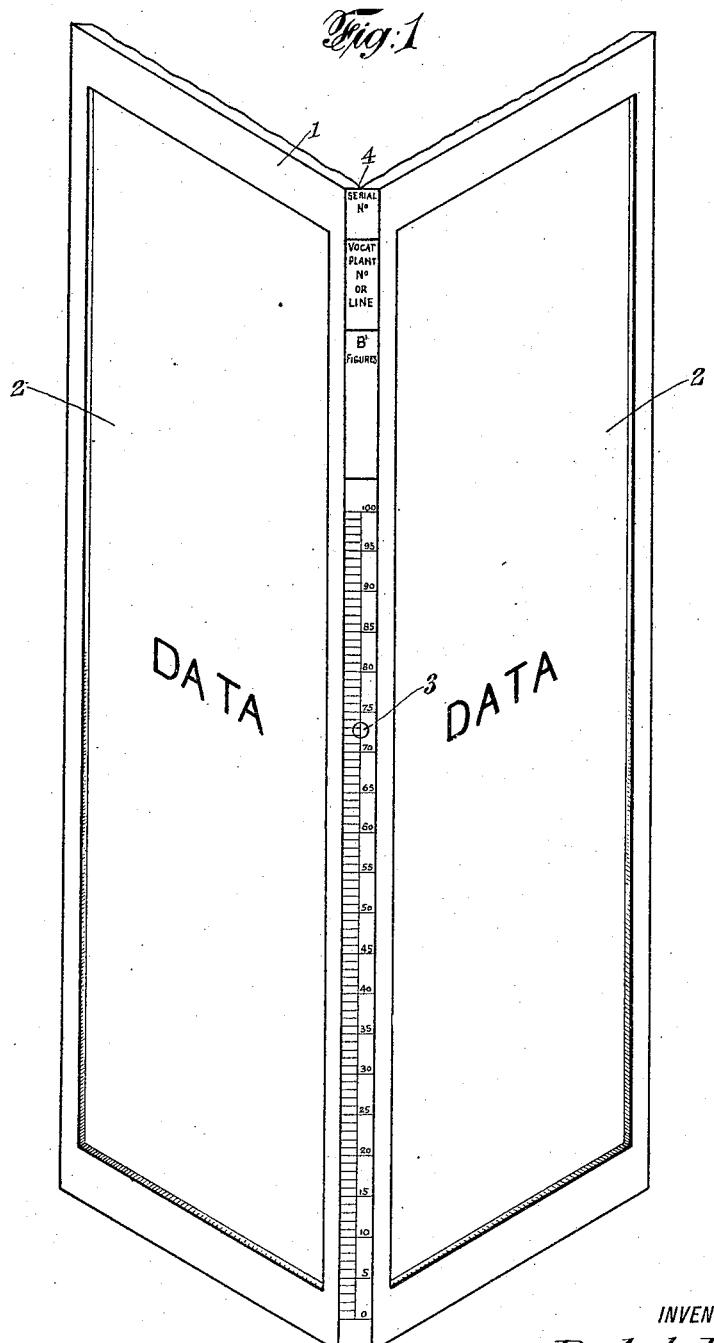
INVENTOR
Ralph E. Fox
BY
Prindle, Wright and Small,
ATTORNEYS

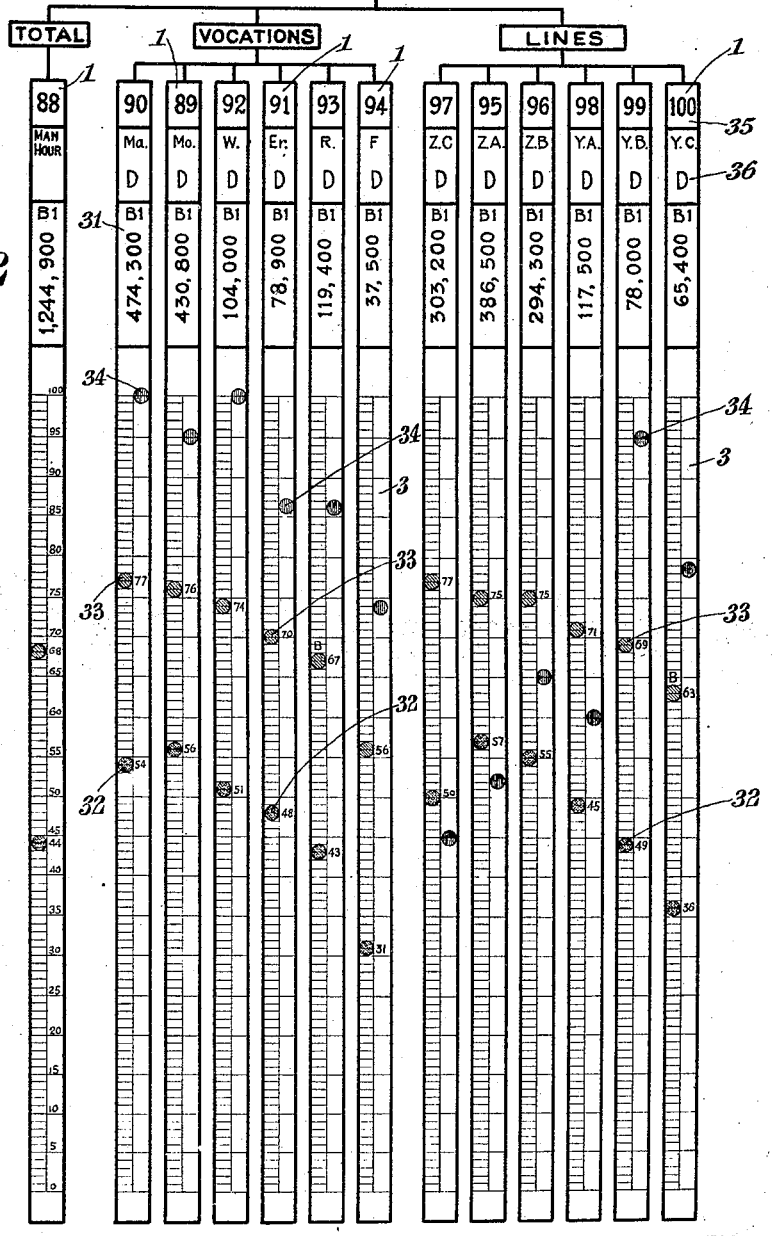

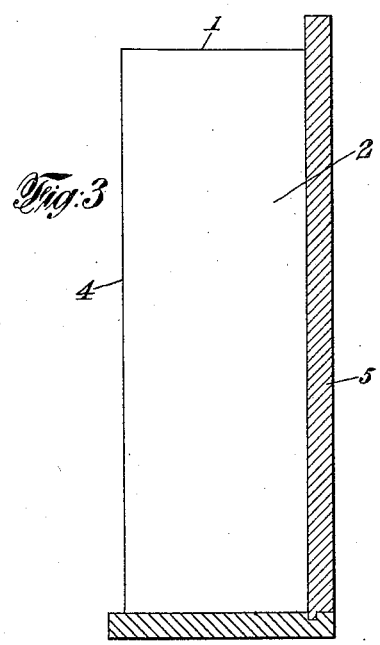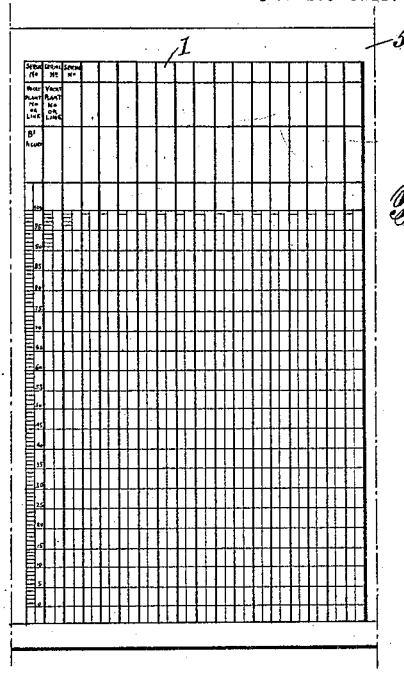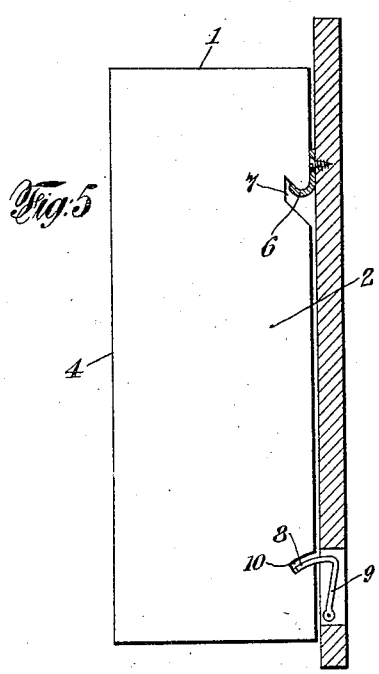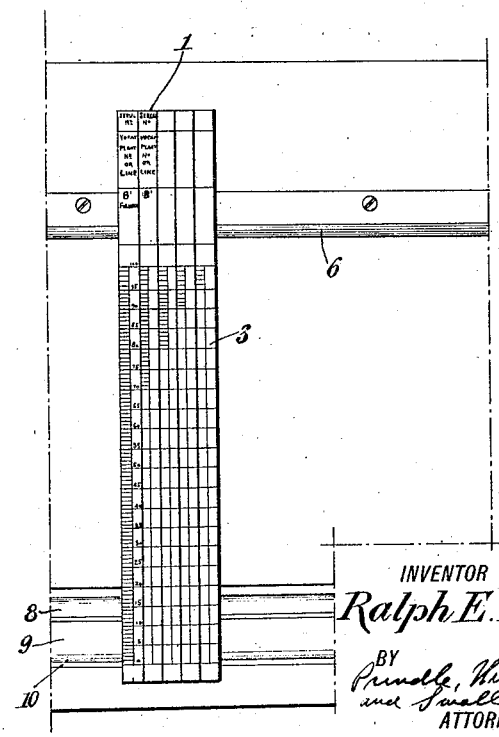

UNITED STATES PATENT OFFICE.

RALPH E. FOX, OF NEW YORK, N. Y.

FLEXIBLE GRAPH.

1,420,249. Specification of Letters Patent. Patented June 20, 1922.

Application filed March 28, 1918. Serial No. 225,303.

*To all whom it may concern:*

Be it known that I, RALPH E. FOX, a citizen of the United States, residing at New York, in the county of New York, and in the State of New York, have invented a certain new and useful Improvement in a Flexible Graph, and do hereby declare that the following is a full, clear, and exact description thereof.

My invention relates to a flexible graph and has for its object to provide a graph or curve which may be rearranged or reassembled to form different graphs or curves.

A further object of my invention is to form a graph or a curve composed of units adapted to be arranged and rearranged to form curves or graphic presentations of desired data.

A further object of my invention is to form a graph or curve composed of units having movable indicia thereon.

Other and further objects of my invention will be apparent from the following description of one embodiment thereof as illustrated in the accompanying drawings, in which—

Figure 1 is a view of a representative unit split apart to illustrate the sides as well as the edges thereof;

Figure 2 a view of a series of units forming an illustrative flexible graph;

Figures 3 and 4, side and front views, respectively, of a rack for supporting a series of units to form a flexible graph; and Figures 5 and 6, side and front views, respectively, of an illustrative supporting device for a series of units to form a flexible graph.

Similar reference characters refer to similar parts throughout the drawings.

The graphical presentation of desired data is becoming a necessity in the conduct of modern business. Curves to represent the rise and fall of prices, curves to represent the quantity production of articles for stated units of time, and curves to represent data of various kinds, are common and almost indispensable. These curves, however, are plotted or arranged on the flat side of sheets or boards, so that if a different arrangement of the same data is desired, it is necessary to construct an entirely new sheet or plot the board anew. In my invention, the unit of representation is adapted to be rearranged or changed about to form any particular curve or graphical representation which may be desired.

In the embodiment of the invention chosen for purposes of illustration, the unit of representation is a slab 1, adapted to receive data on its sides 2, and to indicate (preferably) totalized data by indicia 3 on one or more edges of the slab as the edge 4. To prevent the data from being rubbed from the sides of the units, the sides may be protected in any desired manner as by a transparent substance, or the sides may be recessed and covered or not as seems practical. The basis of representation on the edge may be a scale of any desired kind as a percentage scale.

A series of units arranged with exposed edges as illustrated in Figure 2 of the drawings, will cause the indicia thereon to form a curve or graph. The indicia may be of any desired type or kind, either fixed or movable, sliding or adjustable. Sharp pointed pins, tap holes and screws, or ordinary holes and plugs, or any preferred construction, may be utilized.

The units may be supported in any desired manner as by a rack 5 in which the units are placed, or by any interengaging means as a support 6 on which the units are hung by a suitable cooperating notch 7.

In Figure 2 of the drawings is illustrated one method of use of the invention. A series of units 1 is marked with indicia to indicate conditions in an illustrative manufacturing plant. The basis of representation is time. The six units under the head "Vocations" indicate the capacity of the plant as to each vocation, the time actually being applied in each vocation, the time which should be applied to produce the desired results in each vocation, and the relative importance of each vocation in the general plan of organization in view of the present and immediate situation. Thus the number represented by reference character 31 and which may be referred to as $B^1$ in the first unit under "Vocations" represents the actual capacity of the plant to utilize the time of machinists. The same first unit under "Vocations" represents by indicia 32, which may be yellow, the percentage of time actually applied by machinists computed on the time capacity of the plant for machinists. The same first unit under "Vocations" represents by indicia 33, which may be green, the percentage of time which should be applied to produce the desired results in machinists' work computed on the time capacity of the plant for machinists. The same first unit under "Vocations" represents by indicia 34, which may be red, the relative importance of machinists in turning out the desired product. Thus as the relative importance indicia 34 is shown as having a value of 100, the supervising authority sees at a glance that in order to increase output the time actually employed, which is shown as having a value of 54, must be increased to approximate more nearly the figured requirement of the plant, which is represented by the value 77. The difference between 77 and 100 represents latent production possibilities for utilizing the time for machinists. Similarly the indicia tell the story as to moulders, weavers, erectors, riveters, and finishers.

Under the heading "Lines" in Figure 2 of the drawings, is represented similarly the status of different departments, Z C, Z A, Z B, Y A, Y B, and Y C of the plant. The capacity output, the actual output, the required output, and the relative importance of each particular output is represented.

Under the heading "Total" in Figure 2 of the drawings, is represented the total time value of all the vocations. Each unit may be numbered as indicated at 35 for facility in handling the units, and where many plants are conducted under a central management an identification mark as D (indicated by 36) may be utilized. Other data may be added as convenience dictates. Detailed or supplementary data may be provided on the side or sides 2 of each unit, any desired totals or other data on the edge or edges 4 of the unit, and each unit may be assembled with other units to tell a complete story. The units may be rearranged or changed about to form other data compilations. Thus a curve in the order of relative importance may be formed, or a consumption curve, or a requirement curve, the combinations being unlimited and readily formed without the drafting of new sheets. The units may be kept up to date by changing the data on sides 2 as well as the edge indicia 3.

The units may be locked together if desired by any locking or clamping device. In Figure 5 of the drawings is illustrated a type of lock which may be used with a support and which is shown as comprising an engaging member 8 mounted on a supporting piece 9 and adapted to engage a suitable recess 10 in the units.

Many modifications of my invention will be apparent to those skilled in the art without departing therefrom or from the scope of the claims, my invention not being limited to the embodiment chosen herein for purposes of illustration, but consisting of a flexible graph composed of units adapted to be arranged and rearranged to form desired graphs or curves.

What I claim and desire to protect by Letters Patent is:

1. In a flexible graph, a series of units each of which has movable indicia exposed thereon adapted when said units are assembled to form different graphs or curves, said units being arranged to form a desired graph or curve and adapted to be rearranged to form a different graph or curve.

2. The structure specified in claim 1 in which the series is formed of elongated units.

3. The structure specified in claim 1 in which the indicia is movable vertically on the unit.

4. The structure specified in claim 1 in which the indicia is on the exposed edge of the unit.

5. The structure specified in claim 1 in which the indicia is movable vertically on the unit and is on the exposed edge of the unit.

6. The structure specified in claim 1 in which the indicia indicates capacity, consumption, requirements, and relative importance and the arrangement and rearrangement of the units are in the order of either of said indicia to form a graph or curve thereof.

7. The structure specified in claim 1 in combination with means to support the graph.

8. The structure specified in claim 1 in combination with means to lock the units in assembled position.

9. A unit having moveable indicia thereon and adapted to be assembled to form a flexible graph capable of desired arrangement or rearrangement.

10. The structure specified in claim 9 in which the unit is elongated.

11. The structure specified in claim 9 in which indicia is moveable vertically on the unit.

12. The structure specified in claim 9 in which the indicia is on the exposed edge of the unit.

13. The structure specified in claim 9 in which the indicia is moveable vertically on the unit and is on the exposed edge of the unit.

14. A unit having indicia on its exposed edge and adapted to have data interchangeable on one or more of its sides and adapted to be assembled to form a flexible graph capable of desired arrangement or rearrangement.

15. The structure specified in claim 14 in which the sides of the unit adapted to receive the data are recessed and in which the data is in the recess.

16. The structure specified in claim 14 in combination with means to prevent the data from being rubbed by adjacent units.

17. A unit bearing indicia on its exposed edge and provided with pockets on one or more of its sides adapted to receive data bearing articles.

18. As an article of manufacture, a unit for a flexible graph having thereon a scale from 0 to 100, a number representing capacity and corresponding to said number 100, and means to receive an indicia indicating percentage of consumption computed on the basis of capacity and to receive an indicia to represent requirements.

19. As an article of manufacture, a unit for a flexible graph having thereon a scale from 0 to 100, a number representing capacity and corresponding to said number 100, and means to receive an indicia indicating percentage of consumption computed on the basis of capacity, to receive an indicia to represent requirements, and to receive an indicia to represent relative importance.

20. As an article of manufacture, a unit for a flexible graph having thereon a numbered scale, a number representing capacity, and means to receive an indicia indicating percentage of consumption computed on the basis of capacity and to receive an indicia to represent requirements.

21. As an article of manufacture, a unit for a flexible graph having thereon a numbered scale, a number representing capacity, and means to receive an indicia indicating percentage of consumption computed on the basis of capacity, to receive an indicia to represent requirements, and to receive an indicia to represent relative importance.

In testimony that I claim the foregoing I have hereunto set my hand.

RALPH E. FOX.

Witness:
RUTH J. RIEMAN.